United States Patent [19]
Larkin

[11] 3,736,010
[45] May 29, 1973

[54] PITCH LINK ASSEMBLY AND LOCKING DEVICE THEREWITH

[75] Inventor: Artemas M. Larkin, Glendale, Calif.

[73] Assignee: Lockheed Aircraft Corporation, Burbank, Calif.

[22] Filed: Dec. 3, 1970

[21] Appl. No.: 94,696

[52] U.S. Cl. .................................287/62, 416/61
[51] Int. Cl. ..........................................F16b 7/10
[58] Field of Search ............287/62; 416/61, 168; 74/586; 151/21 R

[56] References Cited

UNITED STATES PATENTS

| 1,975,215 | 10/1934 | Thomas | 287/62 X |
| 2,759,359 | 8/1956 | Jensen et al. | 416/168 X |
| 2,940,784 | 6/1960 | Fell | 287/62 |
| 3,415,324 | 12/1968 | Austin, Jr. | 416/61 |

*Primary Examiner*—Andrew V. Kundrat
*Attorney*—Frank L. Zugelter and George C. Sullivan

[57] ABSTRACT

A connecting rod assembly particularly adaptable as a pitch link or push-pull rod device in a rotary wing aircraft, comprising a telescoping pair of rods splined to each other to prevent relative rotation but providing for relative axial displacement and thus, adjusting its effective length, a calibrated sleeve mounted on the second of such rods, a union sleeve threaded to the first of such rods for clamping the calibrated sleeve to the first rod, and jam nut, lock ring-and-tang ring combinations mounted on the first rod and calibrated sleeve for tightening against the union sleeve after the length of the assembly has been precisely adjusted by rotation of the calibrated sleeve. Each end of the union sleeve includes notches at staggered intervals for cooperative engagement with projections on the lock ring which also includes serrations for engaging corresponding serrations on the tang ring. One lock ring is keyed to the first rod and one lock ring is keyed to the calibrated sleeve. By trail and error of rotation of lock ring to notches, a maximum fit of lock ring to tang ring is achieved while infinite adjustment in effective length for the assembly by rotation of the calibrated sleeve remains available.

An internal locking device for two elements, such as connecting rods, is also disclosed. A pair of spaced circumferential grooves is provided in a cylindrical element (calibrated sleeve) threadedly circumscribing a second rod, and an interior annular groove is also provided in such element, being disposed between the planes of the circumferential grooves. Upon tightening of the cylindrical element against a first rod by means external to the cylindrical element, such as by a threaded sleeve forming a union between external threads on the first rod and the cylindrical element, the threads on the cylindrical element compress against the threads of the second rod, thereby eliminating any tolerance spread or slop that otherwise would exist between such threaded connection and achieving an exact locked position for such rods. The positions of the circumferential grooves and the annular groove are reversible, with the same effect being achieved.

13 Claims, 11 Drawing Figures

Patented May 29, 1973
3,736,010
4 Sheets-Sheet 1
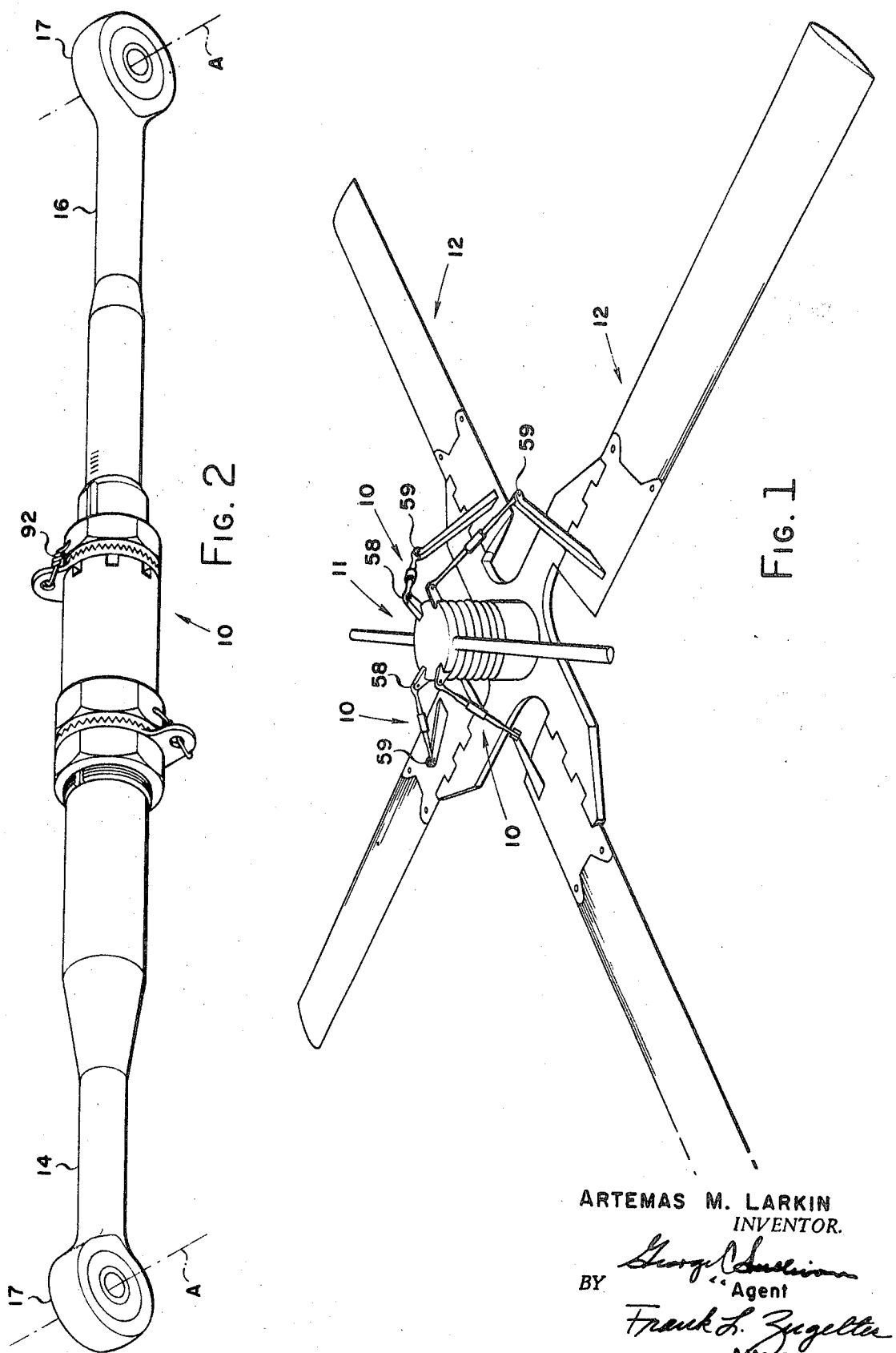
ARTEMAS M. LARKIN
*INVENTOR.*
BY George Sullivan
Agent
Frank L. Zugelter
Attorney

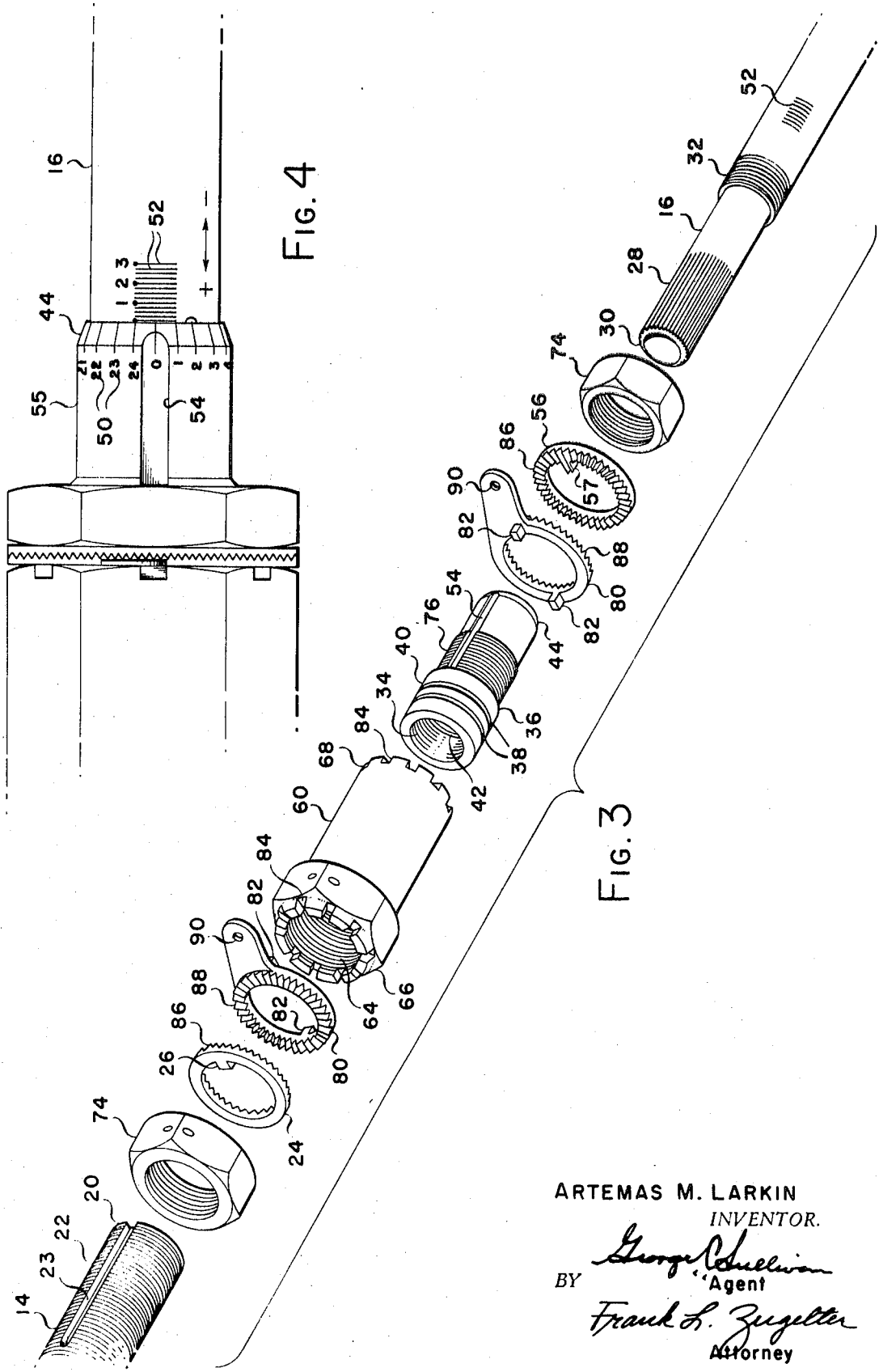

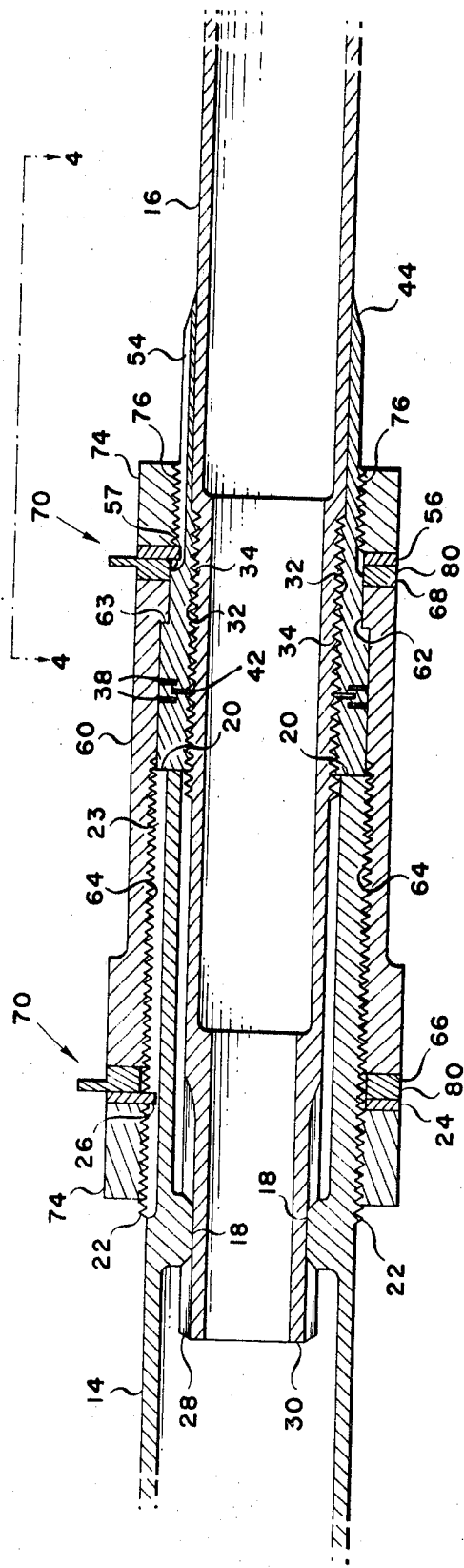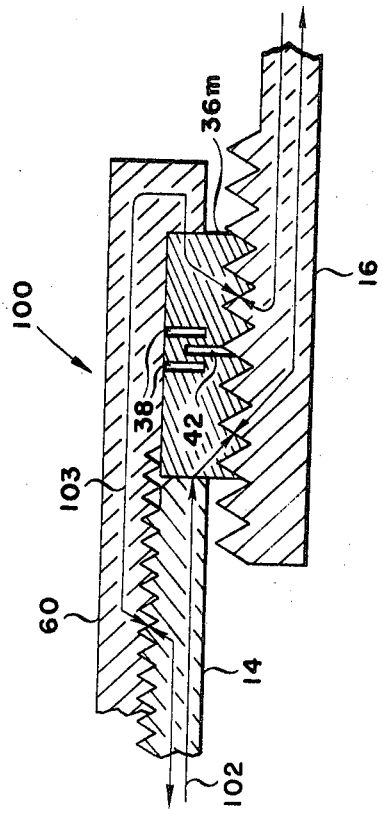

ARTEMAS M. LARKIN
INVENTOR.

PITCH LINK ASSEMBLY AND LOCKING DEVICE THEREWITH

STATEMENT OF GOVERNMENT INTEREST

The invention herein described was made in the course of or under a contract or subcontract thereunder, with the Department of the Army.

BACKGROUND OF THE INVENTION

1. Field of the Invention

The field of art to which the invention is most likely to pertain is located in classes of devices generally relating to pitch link or connecting rod assemblies and locking devices. Classes 151, Nut and Bolt Locks, and 287, Rod Joints or Couplings, U. S. Patent Office Classifications, may be the applicable general areas of art in which the claimed subject matter of the types involved here may be classified.

2. Description of the Prior Art

Examples of prior art devices in the arts to which this invention most likely pertains are U.S. Pat. Nos. 609,144; 1,975,215; 2,367,259; 2,442,691; 2,445,696; 2,759,359; 2,786,364; 2,940,784; 2,956,604; 3,008,525; and 3,415,324.

PROBLEMS IN THE PRIOR ART

Heretofore, there has been no direct read-out on a pin-to-pin dimension included on a pitch link mechanism for a rotary wing aircraft, so that the desired incident angle for a rotor blade is established when one or more rotor blades are replaced on the aircraft. With no way to correlate incident angle markings on a replacement blade with those on a removed blade, it is necessary to rely on a time-consuming procedure of tracking, involving numerous trial settings and maintaining a series of log entries. With the direct read-out as described in this disclosure, a blade can be replaced and the correct angle setting can be arrived at by simple algebraic addition of incident angle values stamped on blades by the manufacturer. These values are established by whirling the newly made blade in a whirl tower in conjunction with a master blade. When satisfactory tracking is established, the incidence angle, (+) or (−), is then stamped on the blade. With these solutions, the disadvantage of retracking of a blade, when failure to record a pitch length setting change occurred, is also completely eliminated.

Also, pitch link assemblies heretofore used have comprised a set of elements adjustably assembled together for a given length, without the convenience of interchangeability of one of such elements by another in case of damage or loss. It was required, in the case of use on rotary wing aircraft, for the entire device to be returned to the factory for recalibration in the event it were to be re-used.

Furthermore, re-establishing of a pin-to-pin or base-to-base dimension of a pitch link assembly incorporating new elements demanded that it be taken from the field of actual use and returned to a bench fixture or special tool for determination once again of such dimension; i.e., the linear distance between the axes of the rod ends which are required to lie coincident with the axes of the connecting points of the assembly to the gyro and blade assemblies.

SUMMARY OF THE INVENTION

Objects of this invention are to provide a novel connecting rod assembly and a novel internal locking device.

Another object of the invention is to provide a quick and facile replacement of an old or damaged rotor blade, and adjusting the new blade to a desired attitude for proper tracking without resorting to a swinging and sighting method. Correction for a known blade angle deviation in a new blade, determined at the factory, is made by merely adjusting the length of the pitch link assembly, based on the blade calibration number determined at the factory for such new blade.

A further object of the invention is to provide reduction in time required to make operational either an installed pitch link assembly or a new rotor blade which in the past has taken several hours after installation thereof. With this invention, only a matter of minutes is involved.

Another object of this invention is to provide infinite axial adjustment for the assembly.

A still further object of the invention is to provide elimination of screw-thread pitch tolerance due to differences in pitch diameter tolerance for two threaded elements, upon final tightening adjustment for the length of the connecting rod assembly.

A further object of this invention is to provide elimination of application of special tools to position a rotor blade in a zero incidence attitude before adjusting the length of a pitch link assembly to register a zero read out in its installed position on a rotary wing aircraft.

A still further object of the invention is to provide adjustability in a pitch link assembly to any deviation from a base dimension without the need for special tools and/or fixtures.

An object of this invention is to provide the advantage of tightening and loosening a locking device used in an internal environment from a position external to the locking device while maintaining a free or open axial or interior volume for such a device.

Another object of the invention is to provide avoidance of deforming beyond the elastic limit the material of a locking device upon applying a locking force thereto, by dimensionally restricting the binding movement between surface-to-surface contact of the locking features in the device upon another element being locked.

A further object of the invention is to provide an exact locking feature for two connected elements by eliminating a tolerance spread which otherwise occurs between the threads of one of such elements and the internal locking device by compressing the latter's threads from an exterior point without exceeding the elastic limits of the material thereof.

A further object of this invention is to provide repeatability of use of a locking device which has not been pre-stressed by not exceeding the elastic limits of the material of the locking device.

An object of this invention is a provision for retention of calibration in a connecting rod assembly regardless of the degree of adjustability thereof.

Another object of this invention is to provide a simplified, adjustable, precise and efficient pitch link, push-pull, or rod connecting assembly.

An object of this invention is to provide interchangeability of production rotor blades without the necessity of re-tracking the rotor blades prior to installation thereof.

A further object of the invention is to provide elimination of tracking procedures which heretofore have been necessary whenever a new rotor blade and/or pitch link assembly has been installed in a helicopter.

Another object of this invention is to provide precise adjustability in the length of a connecting rod assembly.

A further object of the invention is to provide precise adjustability for the pin-to-pin or base-to-base dimension between the effective ends in a connecting rod assembly.

Another object of the invention is to provide stability in a pitch link assembly or the like and which is adjustable lengthwise.

Another object of the invention is to provide pitch pre-setting means for each rotor blade which when corrulated with indicia on each rotor blade makes old and new blades interchangeable, thereby eliminating the time-consuming task of tracking a blade each time prior to installing it on a rotor head.

Another object of this invention is to provide proper orientation of the disposition of rod ends in an assembly of connecting rods for use in an intended environment.

A further object of the invention is the provision for replacement of one or more elements in a connecting rod assembly at the site of use, without the need for returning the entire device to the factory for recalibration in the event of damage or loss thereto.

Another object of this invention is the provision of an effective locking feature disposed internally of two connecting elements and which is actuated externally thereof.

These and other objects and advantages will become more apparent from a full reading of the following description, appended claims thereto, and the accompanying drawing.

BRIEF DESCRIPTION OF THE DRAWINGS

FIG. 1 is a perspective view of a gyro, rotor blade and pitch link assemblies for a rotary wing aircraft.

FIG. 2 is a perspective view of an assembled pitch link assembly incorporating the preferred embodiment of this invention.

FIG. 3 is an exploded perspective view of the elements of a pitch link assembly and internal locking device embodying my invention.

FIG. 4 is a fragmentary enlarged full view of the calibrated portion of a pitch link assembly embodying my invention.

FIG. 5 is a sectional view of a pitch link assembly and internal locking device embodying my invention.

FIG. 6 is an enlarged sectional view of a portion of the view shown in FIG. 5.

DESCRIPTION OF THE PREFERRED EMBODIMENT

Figure 7:
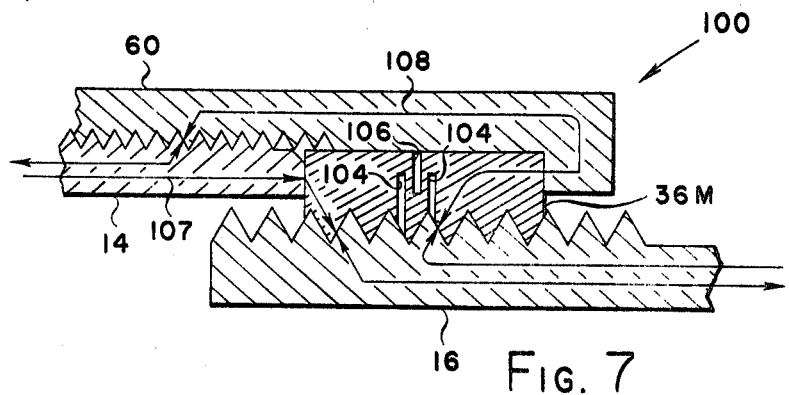
FIG. 7 is a view similar to FIG. 6 but modified.

In the illustrated embodiment of the invention, and referring to the drawing in which reference characters correspond to like numerals in the following description, FIG. 1 shows a preferred environment for utilization of a plurality of connecting rod, push-pull or pitch link assemblies 10. Each assembly 10 is combined with a gyro assembly 11 and one of a plurality of rotor blade assemblies 12, an example of which combination is more fully shown and described in U. S. Pat. No. 3,415,324, issued Dec. 10, 1968.

FIG. 2 illustrates an assembled pitch link assembly 10 comprehended by this invention and in a condition ready for use. FIGS. 3–6 illustrate the preferred embodiment of the invention. Pitch link assembly 10 includes a pair of hollow rods 14, 16 the latter being telescopically related to the former. Each rod 14, 16 has a conventional rod end 17 including a spherical bearing (not shown) for connecting the assembly 10 into its position as shown in FIG. 1. Rod 14 comprises a hollow element having a splined configuration 18 (FIG. 5) internally disposed intermediate its length; i.e., between its outer end 17 and its inner end 20, and an externally threaded configuration 22 generally extending a distance from its inner end 20 to the splined configuration 18. A longitudinal slot 23 is provided along the threaded configuration 22 for keying thereto a tang ring or washer 24 having an internal radially directed projection 26 slidable in such slot 23 upon mounting ring 24 upon rod 14.

Rod 16 comprises an element having a splined longitudinal portion 28, extending outwardly from its telescoped inner end 30, for cooperative engagement with the splined configuration 18 of rod 14, thereby providing means for a non-rotational orientation connecting such rods together. An externally threaded portion 32 is provided intermediate the length of rod 16 for engaging internally disposed threads 34 of a calibrated sleeve 36 (FIG. 3) circumscribing such rod. A pair of spaced generally parallel circumferential grooves 38 are included in an external cylindrical surface 40 at one end of calibrated sleeve 36, and an annular groove 42 is disposed in the internal wall of such sleeve between or intermediate the planes of grooves 38, for purposes to be described hereinafter. A tapered band 44 is provided at the other end of sleeve 36 and includes a graduated scale or indicia 50 provided for correlation to a similar scale or indicia 52 etched in rod 16, whereby the differences in the adjusting of the length of the rod assembly are measurable. The rotation of scale 50 is a function of the linear distance through which rod 16 travels for each revolution of calibrated sleeve 36. In the preferred embodiment, one revolution of calibrated sleeve 36 displaces rod 16 a distance of one thread pitch. A longitudinal slot 54 is provided in a portion 55 for keying to sleeve 36 a tang ring 56 having an internally radially directed projection 57 slidable in such slot 54 upon mounting it upon sleeve 36.

It may be noted here that a proper orientation for the axes A (FIG. 2) of the bearings in the ends 17 of rods 14, 16, with respect to usable pivot or pin connections 58, 59 (FIG. 1) between the gyro and blade assemblies 11 and 12, may be facilitated by forming the longitudinal slots 23, 54 along a preferable peripheral line in their respective elements 14 and 16. Although accurate design of the rod ends 17 and the bearings therein, and in which axes A lie, for the purpose of proper pin connections to the gyro and blade assemblies is a well-known engineering expedient, such preferred incorporation of slots 23, 54 to their respective elements 14, 16 so that axes A and the pin connecting axes lie coincident to each other, enhances and simplifies the operational adjustability for this assembly 10 embodying my invention in its utilization in a rotary wing aircraft.

A sleeve 60 is provided to clamp the calibrated sleeve 36 to rod 14. The sleeve 60 (FIG. 5) includes an internal annular projection 62 thereon at its right end for seating against a shoulder 63 formed in sleeve 36 by reducing the portion containing surface 40. The left portion of sleeve 60 includes internal threads 64 for engagement with the externally threaded configuration 22 of rod 14. Thus, the threading of the sleeve 60 upon the rod 14 clamps the sleeve 36 to the rod 14 and establishes the fixed union therebetween.

It is adjacent the opposing ends 66, 68 (FIG. 3) of union sleeve 60 at which a pair of locking means 70 are respectively disposed, as shown in FIG. 5. Each locking means comprises a jam nut 74, a tang ring 24, 56, and a lock ring 80 adapted for direct engagement with its corresponding tang ring 24, 56. At least one longitudinally or axially extending tab 82 (FIG. 3) is included on each lock ring 80 for cooperative engagement with a correspondingly shaped opening of a plurality of openings or notches 84 provided on each end 66, 68 of union sleeve 60 facing a tab 82. Each tang ring 24, 56 includes a plurality of radially extending serrations 86 cooperatively engaging corresponding facing serrations 88 formed in its associated lock ring 80 abutting an end 66, 68 of union sleeve 60. An integrally formed aperture 90 may be provided on each lock ring 80 for addition of a safety wire 92 (FIG. 2) which securely connects an associated jam nut 74 thereto after final adjustment for assembly 10. In the instant utilization of assembly 10, a jam nut 74 is threaded for cooperative engagement on externally threaded configuration 22 for rod 14, and a jam nut 74 is threaded for cooperative engagement on externally threaded configuration 76 for calibrated sleeve 36.

In assembly, the above-described elements constituting the locking device 70 and a union sleeve 60 are run onto the inner end 30 of rod 16. A second locking device 70 is run onto rod 14. Calibrated sleeve 36 is then threaded to rod 16, and the O-marking on indicia 50 may be superimposed or aligned with the O-marking on indicia 52, in preparation for utilization of assembly 10. Jam nut 74 may then be loosely threaded onto the threaded configuration 76 on calibrated sleeve 36. Rod 14 is then pushed or telescoped upon rod 16, and union sleeve 60 run thereonto. Splined configuration 28 engages splined configuration 18 on rod 14. Thereafter, union sleeve 60 is further threaded (to the left in FIG. 5) on to rod 14 until inner end 20 of rod 14 abuts calibrated sleeve 36. Jam nuts 74 may then be run or turned toward union sleeve 60 to further effect general assembly of pitch link assembly 10.

In regard to the non-rotational orientation for the ends 17 of rods 14, 16, the splined connection between the splining elements 18 and 28 may be precisely arranged such that axes A of the bearings for ends 17 are properly oriented with respect to their connections to pivot pins 58, 59 (FIG. 1) associated with gyro and blade assemblies 11, 12. In regard to the relative axial translation for and between rods 14 and 16, rotation of calibrated sleeve 36 to the right (FIG. 5), after which rod 14 may be further telescoped upon rod 16 to once again abut the left end of sleeve 36, adjustably shortens the effective length between axes A of rod ends 17. On the other hand, rotation of calibrated sleeve 36 to the left on rod 16 adjustably lengthens the effective length between the axes A of rod ends 17. Rotation in either direction of calibrated sleeve 36, of course, assumes that the locking devices 70 are backed off, loosened or made slack from their tightened or torqued positions about the respective ends of union sleeve 60, and that union sleeve 60 is not clamping sleeve 36 to rod 14.

An internal locking device 100 is included in mechanism 10 (FIGS. 5, 6 and 7). A primary purpose of device 100 is to provide by external means an exact locking or securing feature for two elements in relative positions to each other, without damage from use to the threads of such elements or those of the device. An advantage of reuseability of the locked elements and itself is obtained. The three grooves 38, 38, 42 provide elastic compressibility for the sleeve 36 of FIG. 5, and for a sleeve 36m in FIG. 6 (modified, as it need not be only a calibrated sleeve) when a clamping force is applied externally, without permanently deforming the device 100; i.e., by the material of such device not exceeding its elastic limits upon application of force to a sleeve 36, 36m. Such force is obtained by threading or tightening an element such as union sleeve 60 further onto an element such as rod 14. The material in sleeve 36, 36m in the portion or region thereof surrounding and defining grooves 38 and 42 provide spring characteristics for such element and functions in a manner similar to a leaf spring when forces are applied such as illustrated by force lines 102, 103. As a result, a positive surface-to-surface contact, as shown by facing arrow heads on force lines 102, 103 at the junctions of the threads of rod 16 and element 36, 36m, and rod 14 and element 60, is established, thereby eliminating the slop or difference in the pitch tolerance which otherwise exists between such threads. A full bearing, in other words, of the threads is maintained. Tolerance spread, of course, exists in any conventional threading of two elements, even were rods 14 and 16 directly threaded together. The forces 102, 103, however, as generated in this invention are capable of traveling, with continuity between rods 14 and 16, thereby providing a locking, in an exact longitudinal position, of rod 16 relative to rod or element 14. As utilized in pitch link assembly 10, this particular adjustment is further secured by means of torquing jam nut 74 against or toward end 68 of clamping sleeve 60. In the environment of a rotary wing aircraft, any movement of the nature of a fraction of or one or more thousandths of an inch in the effective distance between the axes A of rod ends 17 affects or changes the pitch angle for an associated blade 12 and defeats the purpose of an adjustable pitch link assembly. The positive action of locking device 100 achieves a precise adjustment eliminating such movement, and of course, assures a lock on the desired setting of the micrometer calibrations 50, 52.

FIG. 7 illustrates a sleeve 36M modified over that of sleeve 36 and 36m, to the extent that two spaced grooves 104 are internally disposed in the interior wall of its bore and a single groove 106 is disposed about the circumference of sleeve 36M within the planes of annular grooves 104. The same effect is achieved here, through the action along force lines 107, 108 as those for sleeves 36 and 36m in FIGS. 5 and 6.

Figure 8:
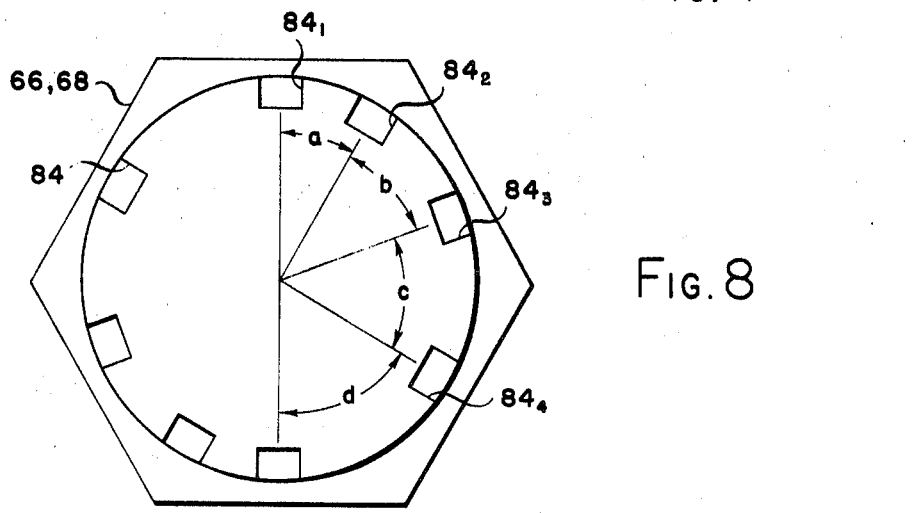
FIG. 8 is an end view of a union sleeve utilized in the invention.
Figure 9:
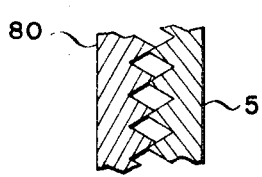
FIGS. 9, 10 and 11 are fragmentary views of the cooperative engagement, in varying degrees, of a lock ring and tang ring.
Figure 10:
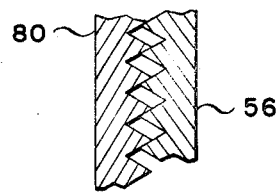
Figure 11:
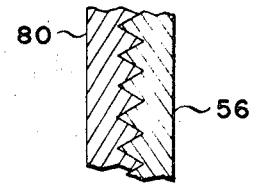

FIGS. 9 and 10 illustrate varying degrees of non-maximum engagement between a lock ring 80 and a tang ring 24, 56, while FIG. 11 illustrates maximum engagement achieved in my invention between the facing serrations 86, 88 on the tang ring 24, 56 and lock ring 80, respectively, for an infinite adjustment in length of the assembly 10 for or by any degree of rotation of calibrated sleeve 36. In practice heretofore, a sleeve similar to union sleeve 60 would include at one of its ends notches at equal intervals abouts its periphery and with which a tab, such as 82 (FIG. 3) on ring 80, would cooperate or seat. Also, a projection on a tang ring, such as projection 26 on tang ring 24, would correspondingly seat in a slot of a rod, such as in slot 23 of rod 14. In such a case, maximum engagement of the noted serrations, such as shown in FIG. 11, could only be achieved at one or a very limited number of adjusted lengths for the connecting rod assembly, and varying percentages to such maximum engagement would otherwise obtain upon torquing of a jam nut against such rings and sleeve, such as suggested by FIGS. 8 and 9. I.e., were a calibrated sleeve incrementally turned so as to effectively change the length of the assembly, the retorquing of a jam nut against a sleeve such as sleeve 60 would not necessarily mean 100 percent (maximum) engagement of such serrations, as the fixed positions of a projection 26 in slot 23 and a tab 82 in an equally spaced notch from its adjacent notches would prevent such serrations from wholly meshing. As a result, the adjusted effective length of a pitch link or push-pull rod assembly was subject to creep between such serrations, depending upon the degree of torquing of a jam nut. This led to a change in such length in the event the rotary blade system was subject to vibration, as it normally is in flight, in addition to changes wrought by repetitious torquing of the jam nut.

While I have not been able to achieve in my preferred embodiment (because of size limitations of the involved elements, the number of serrations possible for a given size, and the optional use of a second tab 82) a 100 percent maximum engagement of such serrations for each instance of or incremental or other turn of calibrated sleeve 36 after adjusting for a desired effective length for assembly 10, the preferred embodiment of my invention does achieve maximum engagement in at least a minimum of 92 percent connections of such serrations, regardless of an infinitesimal or infinite turn of calibrated sleeve 36. In other words, a purpose here is to prevent incomplete or non-engagement of such serrations and to obtain maximum engagement between such serrations for any adjusted length of the mechanism. This has been accomplished by providing staggered intervals $a, b, c, d$ (FIG. 8) between notches 84 on union sleeve 60 and determining by trial and error which of such notches 84 provides maximum engagement for serrations 86 and 88, remembering that each tang ring 24, 56 is restricted to the same non-turning or turning movement of rod 14 or calibrated sleeve 36, as the case may be. After a desired effective length has been determined by rotation of calibrated sleeve 36, and union sleeve 60 has been torqued to a required degree, say, about 100 lb. in., to effect the locking of the calibrated sleeve 36 to rod 16, the tab or tabs 82 on each lock ring 80 is rotated from, say, a notch 84–1 to a notch 84–2, to a notch 84–3, to a notch 84–4, etc., until it is observed that with the tab or tabs 82 seated in one of such notches, the meshing of serrations 88 is at a maximum engagement with serrations 86 on a tang ring 24, 56. The associated jam nut 74 is thence torqued toward union sleeve 60.

In other words, creep between the tang and lock rings, upon torquing of a jam nut, is reduced to an acceptable minimum if not reduced to zero. Where a total number of serrations are given for each lock ring and tang ring, we may mathematically determine usable staggering intervals $a, b, c, d, \ldots$ betwen notches 84. Only the size of the union sleeve 60, the number of serrations, and the number of tabs 82 on each lock ring 80, limit both the number of usable or practical staggering intervals that are incorporated therein and the number of maximum serration engagements.

It should be understood that no significant correlation exists concerning alignment or non-alignment of the radially-extending axes for notches 84 on opposite ends of union sleeve 60, in order to practice the invention, although such a correlation may be developed for the purpose of facilitating manufacture of sleeve 60.

In the preferred embodiment illustrated, a pair of projections 82 match corresponding opposing notches 84 on each end 66, 68 of sleeve 60, however, only one projection 82 is all that is necessary. Thus, staggered intervals, each having a different arcuate distance from any other, may be provided throughout the entire periphery of an end 66, 68, if desired, rather than for merely each 180° of such periphery, as shown in FIG. 8.

FIGS. 9, 10 and 11 illustrate the play which occurs in serrations of known lock and tang ring combinations that have been utilized heretofore, particularly in pitch link or push-pull rod assemblies for helicopters. FIGS. 9 and 10 illustrate the impaired engagement of such serrations after a tang ring has been keyed to a rod and a lock ring is thence put into cooperative engagement therewith after keying with a notch in a sleeve. Subsequent torquing of a jam nut against the tang ring in fact introduces the creep factor, thereby causing looseness in the assembly which may be, and in many instances, is reflected in a change in rotor blade pitch induced thereby and/or induces a flutter of the blade. Such flutter makes the blade hunt for a pitch setting, and this induces aerodynamic instability. FIG. 11 illustrates the maximum engagement of such rings by the inclusion of the staggered intervals $a, b, \ldots$, for notches 84 in sleeve 60, and thus assuring no change in the adjusted effective length for the assembly. Maximum engagement is repititiously possible, of course, for any adjustable length, depending upon the size of sleeve 60, the number of notches 84 and serrations 86, 88 designed into locking device 70, and the number of tabs 82 incorporated into a lock ring 80.

In operation, a number of situations exist for a given helicopter in which a change of a rotor blade or pitch link assembly is necessary. The following outline provides a description concerning the manner of effecting a required condition for a rotor blade mounted thereon by making changes at the time of installation of an assembly 10 and/or of a rotary blade.

1. Substitution of assembly 10 for a known or conventional pitch link assembly.
   a. Installation with the old blade. The pitch deviation marking on the blade is noted and the new assembly 10 is set for that deviation. The old assembly is removed and is replaced by installation of adjusted assembly 10. This holds true assuming that the pin-to-pin dimensions of the old and new link assemblies are the same.
   b. Installation with a new blade. To install a new blade with a new assembly 10, the incidence of deviation for such blade is noted in relation to the attitude incidence setting for the old-and-removed blade. The algebraic sum of these two settings is determined and thence set into the new assembly 10. Both assembly 10 and the new rotor blade are then installed.

2. Substitution of assembly 10 for an assembly 10.
 a. Installation with an old installed blade. The same setting on calibrated sleeve 36 of the used or obsolete assembly 10 is set into the new assembly 10, after which the new assembly 10 is installed.
 b. Installation with a new blade. Noting the old blade's attitude incidence setting and such setting for the new blade to-be-installed (determined at the factory by known tracking practice provided for newly manufactured blades), an algebraic addition is made, and the calculated sum is then set into the new assembly 10, after which both new assembly 10 and blade are installed.

Advantages of assembly 10 should now be apparent. Log keeping is no longer required for each manufactured blade after its incidence angle has been originally determined at the factory in accordance with standard practice. Its incidence angle is accordingly marked on the blade itself so that out in the field when it is to replace another blade in a mounting including assembly 10, the mechanic may make the necessary adjustments in assembly 10 by merely rotating calibrated sleeve 36 the required degree. After installation, the additional re-tracking procedure is no longer required.

Another advantage in assembly 10 is the interchangeability of the various elements constituting same. Each part thereof is replaceable with stock parts presently available. The utilization of locking ring 80 is an example of stock parts being available, as it is less expensive to use it, having 2 projections 82 thereon, rather than going to the expense of manufacturing one having only one such projection thereon. Satisfactory maximum engagement can nevertheless be obtained.

An example of a material for a sleeve 36, 36m or 36M, providing for spring characteristics which lend themselves to the compressibility of the sleeve without exceeding the elastic limits of deformation of the material, is SAE 1095 steel. And what has been achieved, then, is a means for locking a nut or other threaded device to a shaft, even though the shaft is not accessible from the outside as it is disposed within an externally mounted member.

In the preferred embodiment, indicia 52 on rod 16 comprises 0.050 in. spacings between each etched linear graduation, for a circumferential distance of 0.6 in., thereby providing an infinite adjustability for assembly 10 in a rotary wing aircraft such as the assignee's AH–56A aircraft.

Pursuant to the requirements of the patent statutes, the principle of this invention has been explained and exemplified in a manner so that it can be readily practiced by those skilled in the art to which it pertains or with which it is most nearly connected, such exemplification including what is presently considered to represent the preferred embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. An adjustable connecting rod assembly comprising,
 a pair of rods, one rod thereof being telescoped in relation to the other rod thereof,
 means connecting said rods for non-rotational orientation between each other upon such telescoping,
 an externally threaded sleeve internally threadedly mounted upon said other rod and being rotationally and axially displaceable with respect to said rods whereby the length of said assembly is adjustable, said sleeve having an inner end abuttable with the telescoping end of said one rod,
 means threaded upon said one rod for clamping said sleeve to the telescoping end of said one rod,
 a threaded jam nut and a serrated lock ring-and-tang ring combination, one nut and combination mounted on said one rod and another nut and combination mounted on said sleeve, said clamping means being disposed between such combinations,
 at least one tab mounted on and axially extending from each lock ring towards said clamping means,
 a plurality of spaced notches on each end of said clamping means,
 each of said combinations including a radial projection,
 means mounted on said one rod and on said sleeve for keying said projection thereto,
 whereby tightening of said jam nuts towards said clamping means after displacing said sleeve to a desired point in said assembly and clamping of said sleeve to said one rod secures the adjusted length for said assembly.

2. The assembly of claim 1 including calibrated indicia on said sleeve, and similar indicia on said other rod correlated to said calibrated indicia whereby differences in adjusting the length for said assembly is measurable.

3. The assembly of claim 1 in which said clamping means comprises a sleeve having an interior annular projection, said threaded sleeve including a shoulder against which said projection seats thereby making said threaded sleeve clampable to said one rod.

4. The assembly of claim 1 in which said connecting means comprises corresponding splined configurations on the interior of said one rod and on the exterior of said other rod.

5. The assembly of claim 1 in which said radial projection is mounted on said tang ring.

6. The combination of an internal locking device and means disposed externally thereof to acutate it into a locked condition, said device comprising
 a cylindrical member having an internally threaded configuration for cooperative surface-to-surface locking engagement with a threaded member connected thereto,
 a combination of grooves in spaced relation to each other and being annularly mounted exteriorly on and interiorly of said cylindrical member, the depth of said grooves being less than the thickness of said cylindrical member,
 said means comprising
 a first cylindrical element in the nature of a tube abutting one end of said cylindrical member, and
 a second cylindrical element in the nature of a sleeve externally mounted about said cylindrical member and provided with an annular projection of lesser internal diameter than the outer diameter of said cylindrical member abutting the other end of said cylindrical member, said first and second elements being rotatably securable to each other, whereby adjustable rotation of said elements generates a force generally longitudinally directed into said cylindrical member, compressing said grooves together in their spaced relation to each other so as to provide a surface-to-surface contact between the threads of said internally threaded configuration and the threaded member, thereby locking the threads of the latter to the former without exceeding the elastic limits of deformation of the material of said cylindrical member.

7. The combination of claim 6 in which the combination of said grooves comprises at least one pair of spaced grooves being mounted exteriorly, and at least one groove being mounted interiorly and between said pair of spaced grooves.

8. The combination of claim 6 in which the combination of said grooves comprises at least one pair of spaced grooves being mounted interiorly, and at least one groove being mounted exteriorly and between said pair of spaced grooves.

9. A rod assembly comprising first and second hollow cylindrical members the first of which telescopes onto the second, means for preventing rotation of said members relative to each other mounted on said members, a calibrated sleeve rotatably mounted on and being threaded to said second member, the inner end of said sleeve being abuttable against the telescoping end of said first member, said second member having indicia correlated to said calibrated sleeve, a sleeve threaded to and mounted on said first member and having means for clamping said calibrated sleeve against such telescoping end, a pair of locking devices one mounted and threaded on said calibrated sleeve, the other mounted and threaded on said first member, said devices locking said sleeve and calibrated sleeve in an adjusted length for said assembly.

10. The assembly of claim 9 wherein each of said locking devices comprises a lock ring and a tang ring each having serrations on facing sides thereof for mutual engagement, a tab mounted on and axially extending from said lock ring towards said sleeve mounted on said first member for engagement therewith, and a jam nut for torquing said lock ring and tang ring against said sleeve mounted on said first member, and a plurality of complementary openings in each end of said sleeve mounted on said first member for selectively receiving said tab.

11. The assembly of claim 10 wherein said plurality of complementary openings are provided in the ends of said sleeve mounted on said first member at staggered intervals whereby maximum engagement between said serrations for any adjusted length of said assembly is achieved.

12. The assembly of claim 1 as a pitch link assembly for utilization in a rotary wing aircraft.

13. A connecting rod assembly comprising a pair of rods, each having an externally threaded portion, a first one of said rods telescoped within a second one of said rods, means upon said rods to prevent their relative rotation while permitting them to telescope, a sleeve threadedly engaging said first rod for rotational and axial movement thereupon and adapted to abut the end of said second rod for adjusting the length of the connecting rod assembly, clamp means threadedly engaging said second rod and clamping said sleeve to said second rod, separate lock means upon said second rod and said sleeve and engageable with opposite ends of said clamp means, each said lock means including, a lock ring having serrations on one side and having a tab extending axially opposite said serrations for locking engagement with an end of said clamp means, a key ring having an inwardly extending key for keying to said second rod and said sleeve, respectively, and having serrations engageable with those of said lock ring, and a jam nut for securing said lock means against said clamp means, whereby said connecting rod assembly may be adjusted in length and locked.

* * * * *